United States Patent [19]
Toth

[11] 3,781,640
[45] Dec. 25, 1973

[54] ARC WORKING POWER SUPPLY WITH SATURABLE REACTOR CURRENT CONTROL

[75] Inventor: Tibor Endre Toth, Florence, S.C.

[73] Assignee: Union Carbide Corporation, New York, N.Y.

[22] Filed: Aug. 17, 1972

[21] Appl. No.: 281,347

[52] U.S. Cl. .................. 321/18, 321/25, 219/131
[51] Int. Cl. ............................................. H02m 1/08
[58] Field of Search ................ 321/25, 47; 219/131

[56] References Cited
UNITED STATES PATENTS

| | | | |
|---|---|---|---|
| 3,299,341 | 1/1967 | Corey | 321/47 |
| 3,684,942 | 8/1972 | Pettit, Jr. et al. | 321/25 |
| 3,624,405 | 11/1971 | Bishop et al. | 321/25 X |
| 3,354,384 | 11/1967 | Benjamin | 321/25 X |

Primary Examiner—William M. Shoop, Jr.
Attorney—Paul A. Rose et al.

[57] ABSTRACT

An arc working power supply wherein current is controlled by means of a saturable reactor and control circuit which monitors the current to the saturable reactor control winding comparing it to a reference for automatic adjustment. The control circuit includes a slope control for varying the rates of current rise and fall at the beginning and end of the operation.

3 Claims, 4 Drawing Figures

ARC WORKING POWER SUPPLY WITH SATURABLE REACTOR CURRENT CONTROL

The present invention relates to an arc working power supply using a saturable reactor for current control and more particularly to a control circuit for varying the impedance of the saturable reactor.

The impedance of a saturable reactor in an arc working power supply is controlled by varying the DC current supplied to the saturable reactor control winding which in turn is conventionally controlled by a variable rehostate functioning as a current bleed. This simple method of current control has many disadvantages including primarily, the dissipation of a substantial amount of power and sensitivity to line voltage variations. Moreover, current control in this manner does not readily lend itself to remote operation. In addition, many welding applications require that the welding current at the start and end of a welding operation be gradually raised and decreased at preselected rates; a technique known to the art as "slope control." Slope control cannot be achieved economically in a practical and effective manner using the conventional rheostate control circuit especially where remote operation is required.

More sophisticated electronic control circuits have been devised to replace the rheostate type control circuit. However, such controls appear to have some of the same disadvantages noted above and/or certain additional operating disadvantages particularly a limited range of current control.

It is therefore the principal object of the present invention to provide a saturable reactor arc working power supply with an improved current control circuit.

It is another object of the present invention to provide a saturable reactor arc working power supply which includes arc current slope control for independent up and down slope adjustment.

It is a further object of the present invention to provide a saturable reactor arc working power supply which has an extended current range of control particularly at low welding currents.

Further objects and advantages of the present invention will become apparent from a reading of the following description when taken in connection with the accompanying drawings in which.

Figure 1:
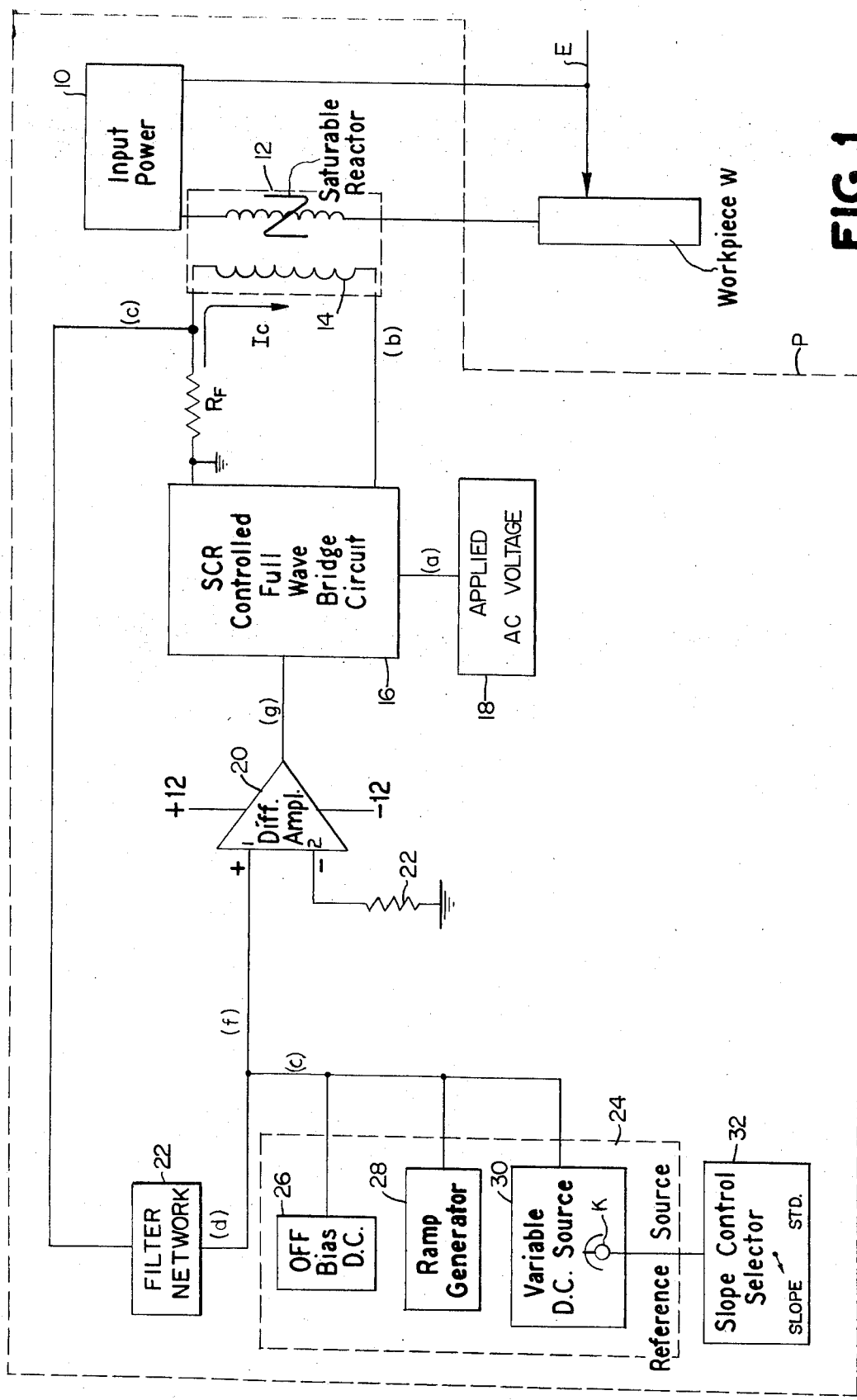
FIG. 1 is a block diagram of the saturable reactor arc working power supply of the present invention in a typical welding set-up.

Referring now to FIG. 1, in which is shown an arc working power supply P including a source of arc working input power 10 electrically coupled through a saturable reactor 12 to a welding set-up including the electrode E and workpiece W. The saturable reactor 12 represents the current control medium for the power supply P. Current is controlled by varying the impedance of the reactor 12 which is in turn accomplished through adjustment of the current supplied to the saturable reactor control winding 14.

Control current $I_c$ is supplied to the control winding 14 from a current control circuit which includes in combination; feedback resistor $R_F$, full wave bridge network 16, a source of AC applied voltage 18, a difference amplifier 20, filter network 22, reference source 24 and a slope control selector 32. Pertinent electrical waveforms that occur at various key points in the block diagram of FIG. 1 are shown in FIG. 2.

The source of applied alternating voltage 18 is represented by the sinusoidal waveform (a) and is derived from a conventional single phase AC line supply. The output of the full wave bridge network 16 is connected through feedback resistor $R_F$ to the control winding 14 of the saturable reactor. The full wave bridge network 16 includes a pair of silicon controlled rectifiers which, as will be explained hereafter, control the duration of each half cycle output pulse from bridge network 16. The silicon controlled rectifiers in bridge network 16 are connected to the output of difference amplifier 20.

An input error signal is applied to difference amplifier 20 equal to the potential difference between the applied signal inputs at terminals one and two respectively. Terminal two is tied through a fixed resistor 22 to ground and as such represents a zero reference potential. The potential at terminal one is composed of superimposed input signals generated from reference source 24 combined with a feedback signal derived from the control current $I_c$.

Figure 2:
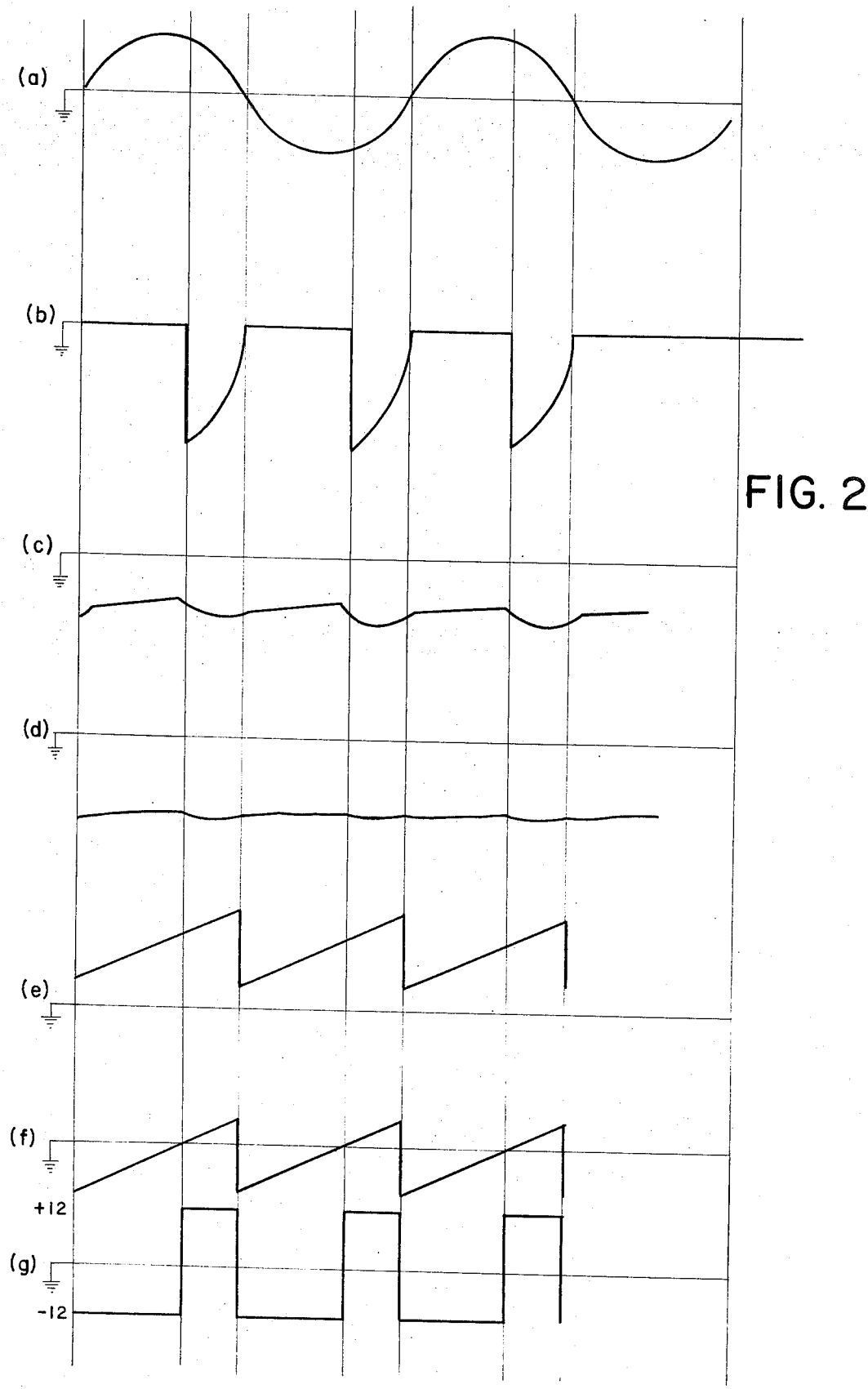
FIG. 2 is a series of electrical wave forms indicating the signal wave shapes that occur at various indicated key points in the block diagram of FIG. 1.

The feedback signal is a voltage taken across feedback resistor $R_F$ connected in series with control winding 14 and is represented by waveform (c) in FIG. 2. The feedback signal is filtered in network 22 into an almost pure DC potential, as illustrated in waveform (d), which potential is proportional to the average magnitude of the control current $I_c$.

The reference source 24 is a composite of a plurality of sources 26, 28 and 30 respectively. Source 30 provides a manually adjustable DC output voltage of a given polarity. Source 28 is a conventional ramp generator which periodically varies from a first DC potential to a second and higher DC potential at a predetermined rate, preferably in syncronism with each half cycle of the applied AC voltage. Source 26 provides a DC bias potential the sole purpose of which is to insure a zero DC background potential for the output of reference source 22 when knob K of source 30 is adjusted to zero.

The slope control selector 32 when adjusted to the slope position converts the otherwise constant potential output from source 30 to a gradually increasing or decreasing output at a predetermined rate and for a predetermined period of time. The operation of the slope control selector 32 will be explained hereafter in connection with the circuit diagram of FIG. 3.

The operation of the current control circuit is more readily understood from the waveforms shown in FIGS. 2(a–g). Waveform (b) represents the output potential across the control winding 14. The feedback signal as stated earlier is shown in FIG. 2(c). The output of reference source 24, taken alone, is illustrated by FIG. 2(e). The combined input signals to terminal one of difference amplifier 20 is illustrated in FIG. 2(f) and the output of amplifier 20 represented by waveform (g).

As should be apparent from FIGS. 2 (f) and (g) the output of the difference amplifier 18 reverts from a negative to positive potential at each instant of zero crossover ($t_c$) and reverts back from the positive level to the negative level at each instant of zero applied voltage. The instant ($t_c$) may be adjusted by varying the control knob K OF DC source 30 thereby raising or lowering the DC level of waveform 2(e) and accordingly shifting the crossover to the left or right respectively. Hence by appropriate calibration of control knob K, the magnitude of the welding current can be precisely set.

Figure 3:
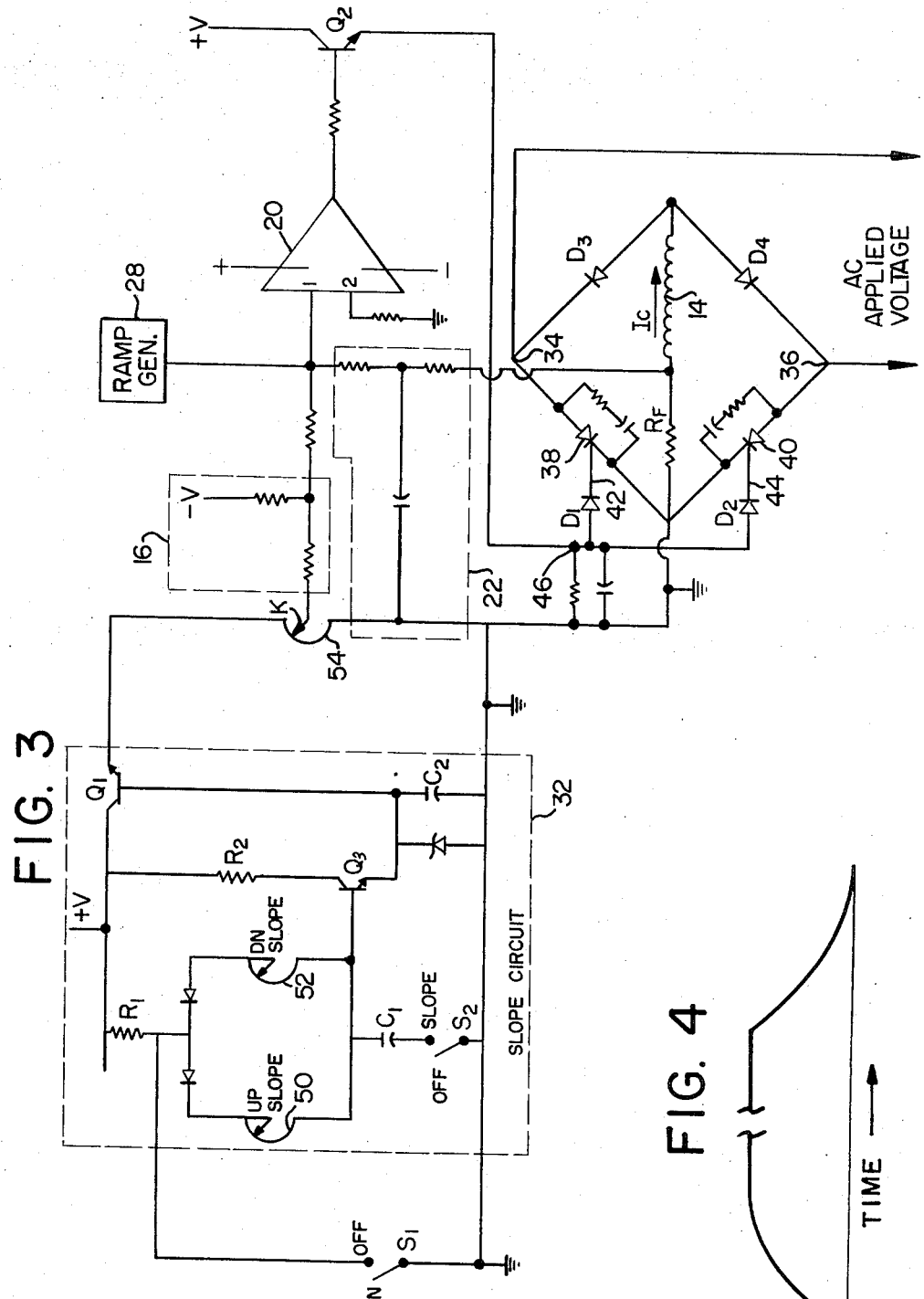
FIG. 3 is a partially schematic circuit diagram of the saturable reactor control circuit of FIG. 1.

Referring now specifically to the circuit diagram of FIG. 3 in which the control winding 14 of saturable reactor 12 is shown connected in series with feedback resistor $R_F$ across the output of bridge network 16. The bridge network has two parallel legs connected at opposite ends identified as points 34 and 36 respectively and across which is imposed the AC applied voltage 18. A pair of silicon controlled rectifiers (SCR's) 38 and 40 respectively, make up one leg of the bridge network with their cathodes connected in common to ground. The control gates 42 and 44 of SCR's 38 and 40 respectively, are connected to a common junction point 46 through diodes $D_1$ and $D_2$. The output of difference amplifier 20 is connected through a cathode follower $Q_2$ to the common junction point 46 for simultaneously providing a firing pulse to control gates 42 and 44 respectively, at each negative to positive reversal in output polarity. Hence, when point 34 is positive with respect to point 36, SCR 38 will energize as soon as control gate 42 receives a firing pulse. During this half cycle SCR 40 remains back biased and cannot energize. A path is thus established from point 34 through SCR 38 winding 14 and diode $D_4$ to point 36. During the opposite half cycle of applied AC voltage a path will be established through SCR 40, control winding 14 and diode $D_3$ as soon as control gate 44 of SCR 40 receives a firing pulse. SCR 38 during this half cycle is back biased and cannot energize.

Hence, with the slope control selector in the standard or off position the average D.C. magnitude of the control current ($I_c$) can vary only by adjustment of control knob K and is insensitive to line voltage variations, temperature changes, etc.

The slope circuit 32 remains inactive until switch $S_2$ is placed into the slope position. Actually a number of slope switches and capacitors such as $C_1$ may be used to tailor particular slope requirements but for simplicity only one switch $S_2$ and a single capacitor $C_1$ is shown.

Switch $S_1$ is simply a torch switch in the operator's welding torch control so that the power supply may be automatically switched on when the welding operation, as determined by the operator, is ready to proceed and may be automatically switched off when the operation ends. With switch $S_1$ in the on position and slope selector switch $S_2$ in the off position a positive voltage, approximately equal to +V, will exist across potentiometer 54. The output from wiper arm K, corresponding to control knob K, will then be a positive DC voltage having a magnitude corresponding to the wiper arm setting. A small predetermined negative voltage from off bias network 16 is superimposed to reduce the voltage a predetermined amount. The resultant positive DC level is added to the ramp signal from ramp generator 28 thus providing the output shown in FIG. 2(e) representing the output of reference source 24 of FIG. 1. The filtered feedback signal derived from across resistor $R_F$ is of negative polarity and is combined with the reference source output as shown in FIG. 2(f) crossing over from negative to positive polarity at instant of time $t_c$ during each half cycle of applied AC voltage. The crossover instant of time $t_c$ is variable through adjustment of control knob K.

Figure 4:
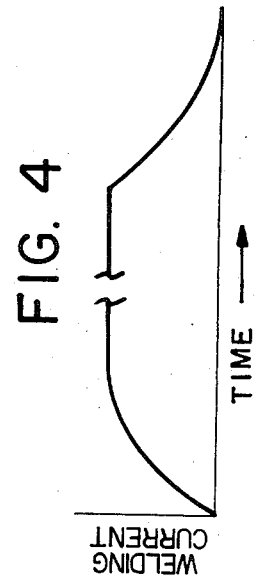
FIG. 4 illustrates a current-time trace for a complete operation employing slope control at the start and end thereof.

By throwing switch $S_2$, preferably at the start of the welding operation into the slope position the welding current will increase gradually until full voltage is built up across potentiometer 54. The rate of increase is exponential but can be made linear, if desired, by modifying the simple potentiometer circuits shown to that of constant current sources. The time constant for both up and down sloping is controlled by adjustment of the up and down slope potentiometers 50 and 52 respectively. During the up slope period potentiometer 50 controls the charging rate of capacitor $C_1$ and thus the voltage across capacitor $C_2$ and as such potentiometer 54. Down slope is accomplished, preferably at the end of the welding operation, by placing switch $S_1$ into the off position. Potentiometer 52 controls the discharge rate of capacitor $C_1$. A typical welding current time trace is shown in FIG. 4 using both up and down sloping of the welding current.

I claim:

1. An arc working power supply adapted to be connected in circuit with an electrode and workpiece and including in combination a source of input power, a magnetic control element having a control winding, and a current control circuit for controlling the magnitude of current in said control winding, said current control circuit comprising:

a source of alternating current;

a full wave bridge rectifier network coupling said source of alternating current to said control winding, said rectifier network including gate means for controlling conduction of said network during each half cycle of alternating current;

sensing means for providing an output DC feedback signal responsive to the DC level of current in said control winding;

means for generating a DC reference signal which varies linearly between a first and second DC potential at a rate in synchronism with each half cycle of said alternating current; and means for energizing said gate means when the difference between said reference signal and said feedback signal equal a predetermined value.

2. An arc working power supply as defined in claim 1 further comprising a slope control circuit including means for integrating said DC reference signal for a first predetermined time period and means for differentiating said DC reference signal for a second predetermined period of time.

3. An arc working power supply as defined in claim 2 wherein said slope control means comprises a capacitor charging and discharging circuit and includes a first manually variable resistor for controlling the charging time of said capacitor circuit and a second manually variable resistor for controlling the discharge time of said capacitor circuit.

* * * * *